United States Patent [19]

Hen

[11] Patent Number: 5,089,150
[45] Date of Patent: Feb. 18, 1992

[54] METHOD OF INCREASING RETENTION OF SCALE INHIBITORS IN SUBTERRANEAN FORMATIONS

[75] Inventor: John Hen, Skillman, N.J.
[73] Assignee: Mobil Oil Corporation, Fairfax, Va.
[21] Appl. No.: 529,805
[22] Filed: May 29, 1990
[51] Int. Cl.$^5$ .................. E21B 43/28; E21B 41/02
[52] U.S. Cl. ............... 252/8.552; 252/855.5; 252/80; 252/82; 252/146; 252/147; 252/148; 252/180; 252/389.22; 252/389.2; 252/390; 252/392; 422/15; 422/17; 166/279; 166/300
[58] Field of Search ............... 252/8.552, 8.555, 80, 252/82, 196, 197, 198, 180, 389.2, 389.22, 390, 392; 422/15, 17; 166/279, 300

[56] References Cited

U.S. PATENT DOCUMENTS

| | | | |
|---|---|---|---|
| 2,978,026 | 4/1961 | Bemis | 166/312 |
| 3,276,916 | 10/1966 | Wurstner | 252/389.2 |
| 3,305,019 | 2/1967 | Katzer | 252/8.552 |
| 3,325,567 | 6/1967 | Suer | 252/389.2 |
| 3,336,221 | 8/1967 | Ralston | 210/58 |
| 3,429,824 | 2/1969 | Tate | 252/8.552 |
| 3,467,192 | 9/1969 | Nolan et al. | 166/279 |
| 3,481,869 | 12/1969 | Jones | 252/8.552 |
| 3,483,925 | 12/1969 | Slyker | 166/279 |
| 3,619,427 | 11/1971 | Kautsky | 252/8.552 |
| 3,704,751 | 12/1972 | Tate | 252/8.552 |
| 3,827,977 | 8/1974 | Miles et al. | 252/8.55 B |
| 3,880,765 | 4/1975 | Watson | 252/8.552 |
| 3,904,522 | 9/1975 | Greenfield | 252/8.552 |
| 4,163,733 | 8/1979 | Buckman et al. | 252/389.22 |
| 4,209,398 | 6/1980 | Ii et al. | 252/389.22 |
| 4,406,811 | 9/1983 | Christensen et al. | 252/389.22 |
| 4,476,930 | 10/1984 | Watanabe | 166/279 |
| 4,485,874 | 12/1984 | Meyers | 166/279 |
| 4,495,996 | 1/1985 | Meyers et al. | 166/279 |
| 4,514,504 | 4/1985 | Rothman | 436/85 |
| 4,563,284 | 1/1986 | Amjad | 252/8.552 |
| 4,741,400 | 5/1988 | Underdown | 166/279 |
| 4,902,443 | 2/1990 | Penninger et al. | 252/389.1 |
| 4,937,002 | 6/1990 | Bainbridge et al. | 252/8.554 |

OTHER PUBLICATIONS

Streitwieser & Heathcock, "Introduction to Organic Chemistry", 1985, Third Edition, pp. 465–467.

Primary Examiner—Richard D. Lovering
Assistant Examiner—Chhaya Sayala
Attorney, Agent, or Firm—Alexander J. McKillop; Charles J. Speciale; Charles A. Malone

[57] ABSTRACT

A novel method of injecting or squeezing a cross-linked scale inhibitor down a well into a subterranean formation which significantly lengthens its effective life is accomplished by cross-linking a carboxylic acid-containing polymeric or organophosphorus-containing inhibitor with a polyalcohol. The significant extension of life afforded by cross-linking with a polyalcohol improves the overall economics of oil production in fields prone to mineral scale.

29 Claims, 1 Drawing Sheet

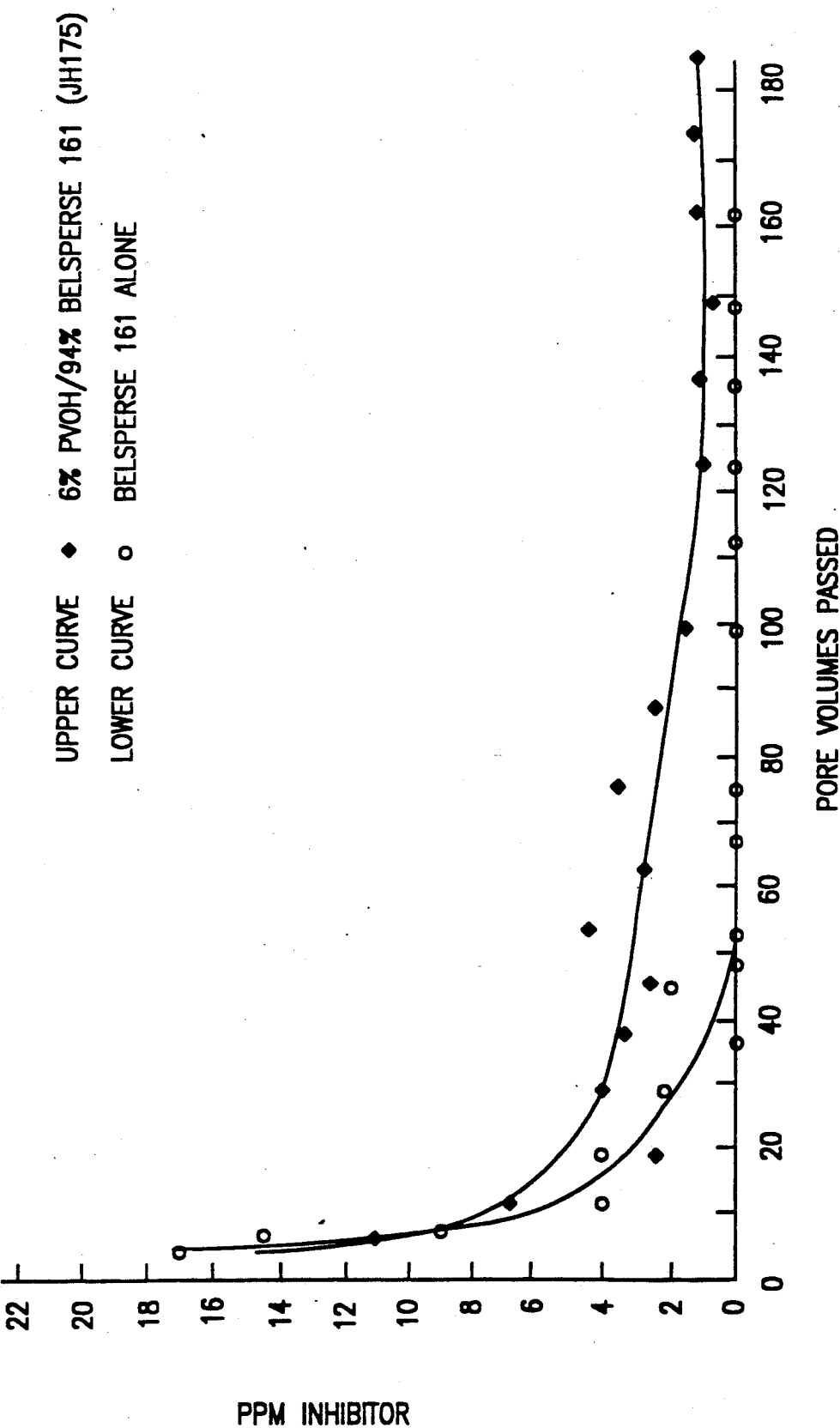

METHOD OF INCREASING RETENTION OF SCALE INHIBITORS IN SUBTERRANEAN FORMATIONS

FIELD OF THE INVENTION

This invention is related to methods for inhibiting scale formation. Specifically, it is directed to a method for extending the life of scale inhibitors in subterranean formations.

BACKGROUND OF THE INVENTION

Scale deposits frequently occur in the production of water, oil and gas from subterranean formations and can result in plugged well bores, plugged well casing perforations, plugged tubing strings, stuck downhole safety valves as well as other valves, stuck downhole pumps and other downhole and surface equipment and lines, scaled formations and fractures in the vicinity of the well. Scale formation can occur as a result of mixing incompatible waters in the well which produce precipitates, or as a result of temperature and pressure changes in the produced waters during production. Generally, incompatible waters occur in waterflooding, as injected sea water mixes with formation water in the borehole during water breakthrough. The more common concern is scale deposited due to changes in supersaturation or solubility of minerals in the formation or produced waters caused by pressure and temperature changes, or changes in other physical and chemical parameters, such as gas compositions, ratio of gas/oil/water. Scale may also be formed from corrosion of metal equipment used in the subterranean oil and gas production. Scale formation is also a problem in aqueous systems used in cooling towers, boilers and the like. Precipitation frequently encountered as scale includes calcium carbonate, calcium sulfate, barium sulfate, magnesium carbonate, magnesium sulfate, and strontium sulfate.

Scale formation can be reduced by the introduction of inhibitors into the formation. Various inhibitors are known, including carboxylated polymers, organophosphates, organophosphonates and polyphosphonates. Typically, carboxylated polymers are polymers and copolymers of acrylic or methacrylic acids, commonly referred to as polyacrylic acids. Organophosphorous-containing inhibitors include alkyl ethoxylated phosphates; ethylenediaminetetramethylene phosphonic acid; aminotrimethylene phosphonic acid; hexamethylenediaminetetramethylene phosphonic acid; diethylenetriaminepentamethylene phosphonic acid; hydroxyethylidenediphosphonic acid and polyvinyl phosphonic acid. The injection of scale inhibitors without pre or post cross-linking to protect an oil or gas well from mineral scale formation is widely practiced. However, such treatments often result in poor retention in the subterranean formation, quick depletion and frequent retreatments.

In an article that appeared in the Journal of Petroleum Technology on page 1303 in June 1982, A. J. Essel and B. L. Carlberg disclosed a method to increase retention of an inhibitor in a subterranean limestone formation by injecting the acid form of a polyphosphonate inhibitor which forms a slightly soluble calcium salt. Calcium ions released on dissolution of some of the limestone rock by the acid precipitates calcium polyphosphonate allowing greater retention in the rock. However, this method does not work in sandstones, because sandstones are not soluble in acids, nor do they form calcium ions even when dissolved.

U.S. Pat. No. 3,827,977 issued to L. A. Miles et al discloses a method of increasing inhibitor retention by in situ formation of the relatively water or brine insoluble polycation salt of polyacrylic acid or hydrolyzed polyacrylamide. A disadvantage in this method is that a large excess of metal ion is required which increases the danger of damaging the formation from premature precipitation.

Therefore, what is needed is a method to increase the retention time of an inhibitor which method will not damage a formation and which can be used in substantially all formations.

SUMMARY

In the practice of this invention, the life of a scale inhibitor is extended by cross-linking an inhibitor with a polyalcohol. The scale inhibitor includes carboxylated polymers, phosphorus-containing materials such as organophosphates, organophosphonates and polyphosphonates. Said carboxylated polymer contains either wholly or partially, an alpha, beta olefinically unsaturated carboxylic acid with a molecular weight of 200 to 20,000. The organophosphorus-containing inhibitors include alkyl ethoxylated phosphates; ethylenediaminetetramethylene phosphonic acid; aminotrimethylene phosphonic acid; hexamethylenediaminetetramethylene phosphonic acid; diethylenetriaminepentamethylene phosphonic acid; hydroxyethylidene diphosphonic acid and polyvinyl phosphonic acids. Polyacrylic acid and phosphino polyacrylic acid having a molecular weight of about 1,000 to about 5,000 are preferred scale inhibitors. Polyalcohols which can be utilized are those having two or more hydroxyl functions. Exemplary polyalcohols include ethylene glycol, glycerol, and polyvinyl alcohols. Cross-linking occurs by esterification of the carboxylic acid in the inhibitor with the hydroxyl groups in the polyalcohol which results in a large molecular weight increase. In the case of an organophosphorus-containing inhibitor, cross-linking occurs by esterification of the phosphoric or phosphonic acid in the inhibitor with the hydroxyl group in the polyalcohol. The increased molecular weight of the cross-linked inhibitor enhances its retention in subterranean formations. When the desired molecular weight or viscosity has been obtained, the cross-linked polymer is partially neutralized with a base and directed into a formation by a well.

It is therefore an object of this invention to cross-link a carboxylic acid-containing or organophosphorus-containing inhibitor with a polyalcohol and thereby increase the molecular weight of the inhibitor in order to extend the inhibitor's life.

It is another object of this invention to provide for a cross-linked carboxylic acid-containing or organophosphorus-containing inhibitor with enhanced compatibility for brines.

It is yet another object of this invention to provide for a non-gelled carboxylic acid-containing or organophosphorus-containing scale inhibitor cross-linked with a polyalcohol so as to gradually release inhibitors from the cross-linked product.

It is still yet another object of this invention to provide for an esterified cross-linked inhibitor which releases the inhibitor through hydrolysis of an ester which release is dictated by the extent of cross-linking, steric hindrance and temperature.

It is a still yet further object of this invention to extend the life of a scale inhibitor so as to minimize retreatments and loss of hydrocarbonaceous fluid production.

BRIEF DESCRIPTION OF THE DRAWINGS

FIG. 1 is a graph which depicts the extension of inhibitor life by cross-linking with polyvinyl alcohol.

DETAILED DESCRIPTION OF THE INVENTION

In the practice of this invention, inhibitor life is extended by cross-linking the inhibitor with a polyalcohol. The inhibitor is either carboxylic acid-containing or organophosphorus-containing. The carboxylic acid-containing inhibitor is a polymer based wholly or in part on an alpha, beta olefinically unsaturated carboxylic acid with a molecular weight of 200 to 20,000. Polyacrylic acid and phosphino-polyacrylic acid of molecular weight of about 1,000 to 5,000 are typical carboxylic acid-containing scale inhibitors. The organophosphorus-containing inhibitor includes organophosphates, organophosphonates, and polyphosphonates. The polyalcohol is any chemical with two or more hydroxyl functions such as ethylene glycol, glycerol, the broad range of polyvinyl alcohols with varying molecular weights and degrees of hydrolysis, and other modified polyvinyl alcohols or co-polymers of vinyl alcohol. Cross-linking via esterification of the carboxylic acid or phosphoric acid (or phosphonic acid) in the inhibitor with the hydroxyl groups in the polyalcohol leads to a large molecular weight increase. Increased molecular weight of the cross-linked inhibitor enhances its retention in subterranean formations. As the well is brought back to production, the effective concentration of inhibitor is slowly released by gradual hydrolysis of the ester bonds (or breakage of the cross-linking sites). Coreflood studies have shown that a cross-linked product of this invention provides 4 times the treatment life obtained from an uncross-linked inhibitor.

The cross-linked inhibitor can be prepared by any known esterification process. A preferred method is to heat a concentrate of the reactants in water at 50° to 150° C. for about 6 to 60 hours with the aid of a strong acid catalyst such as hydrochloric acid. When the desired viscosity or molecular weight has been achieved, the product is partially neutralized with base to quench the reaction.

Suitable carboxyl acid-containing polymeric inhibitors include all homopolymers or copolymers (composed of two or more co-monomers) containing as one of its components, an alpha, beta ethylenically unsaturated carboxylic acid such as acrylic acid, methacrylic acid, maleic acid, maleic anhydride, itaconic acid, fumaric acid, mesoconic acid and citraconic acid, and monoesters of dicarboxylic acids with alkanols having 1-8 carbon atoms. When the inhibitor is a copolymer, the other component monomer can be an alpha, beta-ethylenically unsaturated monomer containing a non-polar group such as styrene or olefinic monomers; an alpha, beta-ethylenically unsaturated monomer containing a polar functional group such as vinylacetate, vinyl chloride, vinyl alcohol, acrylate ester, acrylamide or acrylamide derivatives; and an alpha, beta-ethylenically unsaturated monomer containing an ionic functional group comprising methacrylic acid, maleic acid, as styrenesulfonic acid, 2-acrylamido-2-methylpropanesulfonic acid (AMPS ®), vinylsulfonic acid, vinylphosphonic acid. The carboxylic acid-containing polymeric inhibitor includes modification of the polymers described above such as phosphino-polyacrylic acid known in the trade as Belsperse 161 or Belasol S-29. The molecular weight range of the inhibitors utilized in this invention is from about 200 to about 20,000.

Suitable organophosphorus-containing inhibitors include alkyl ethoxylated phosphates; ethylenediamenetetramethylene phosphonic acid; aminotrimethylene phosphonic acid; hexamethylenediaminetetramethylene phosphonic acid; diethylenetriaminepentamethylene phosphonic acid; hydroxyethylidene diphosphonic acid and polyvinylphosphonic acid. Preferred organophosphorus compounds are described in U.S. Pat. Nos. 3,336,221 and 3,467,192. These patents are incorporated by reference herein.

Suitable polyalcohols include all compounds containing two or more hydroxyl groups. These include ethylene glycol, glycerol and their higher homologs; dihydroxy-terminated polyethylene oxides or polypropylene oxides; polyvinyl alcohols of varying degrees of hydrolysis and molecular weight; modified polyvinyl alcohols or co-polymers of vinyl alcohol. The molecular weight range of the polyalcohols is from about 62 to several millions; preferably in the 500 to 130,000 range.

The following examples more clearly demonstrate the invention, and should not be interpreted as limiting the scope of the invention.

EXAMPLE 1

7.00 grams of 50.0% by weight of polyacrylic acid (with a molecular weight of 5,000) in water was mixed with 3.00 grams of glycerol and 0.57 gram of water. Different amounts of three strong acid catalysts (sulfuric acid, hydrochloric acid, trifluoromethane-sulfonic acid) were added as indicated in Table 1. After heating at 98° for 18 hours, all four blends produced viscous products ranging from 22 cps to 2,000 cps from an original value of 8 cps. The viscosity of the cross-linked products was directly dependent on the concentration of acid catalyst rather than the specific acid catalyst used.

TABLE 1

Effect of Acid Catalyst on Reaction of Glycerol with Polyacrylic Acid

| Catalyst | | Viscosity (cps) | |
|---|---|---|---|
| Type | meq* | Original | Final |
| sulfuric acid | 9.8 | 7.7 | 94 |
| hydrochloric acid | 10.7 | 8.0 | 2,000 |
| trifluoromethane-sulfuric acid | 3.1 | 7.9 | 22 |
| sulfuric acid | 5.1 | 7.9 | 54 |

*meq = milliequivalents

EXAMPLE 2

This example illustrates the effect of weight ratio of phosphino-polyacrylic acid to polyvinyl alcohol on the viscosity of the cross-linked product. Phosphino-polyacrylic acid was obtained as a 50% solids product known as Belsperse 161 from Ciba Geigy. The polyvinyl alcohol comprised a 98% hydrolyzed product with a molecular weight of 12,500. This product was obtained from Air Products and is known as Airnol 103. Two compositions, one at 97/3 ratio and the other at 94/6 ratio of inhibitor to polyvinyl alcohol are described in Table 2. Both were at 40% non-volatile solids. The amount of hydrochloric acid (HCl) catalyst employed was sufficient to bring the inhibitor to 0% ionization and the normality of HCl in the reactant phase to 0.1N. The two compositions were heated at 99° C. for 16 hours. The composition at 97/3 ratio gave a 74% increase in viscosity from 23.1 cp to 40.0 cps. The 94/6 ratio with twice as much polyvinyl alcohol produced a 762% increase in viscosity from 27.5 cps to 237 cps. Viscosities were measured at 25° C. with a Brookfield LVT Viscometer with Teflon and Kynar-coated spindles

TABLE 2

| Effect of Molecular Weight and Content of Polyvinyl Alcohol | | |
|---|---|---|
| Airnol 103 (g) | 0.36 | 0.72 |
| Belsperse 161 (g) | 24.50 | 23.75 |
| 37% HCl (g) | 3.5 | 3.4 |
| Deionized-water (g) | 11.64 | 12.13 |
| Initial viscosity 25° C. in cps | 23.1 | 27.5 |
| Final viscosity after 16 hours at 99° C. 25° C. in cps | 40.0 | 237 |
| % Increase | 74 | 762 |

EXAMPLE 3

Example 3 shows the effect of the concentration of the acid catalyst. A base composition was prepared. It contained 0.72 g of Airnol 103, 23.75 g of Belsperse 161, and deionized water to provide 30% solids. The catalyst concentration was varied by adding 2.98 g, 3.2 g and 3.4 g of 37% HCl to three separate base compositions. After thorough mixing, the compositions were kept at 99° C. for 16 hours. The resulting viscosity of the products increased with increasing catalyst concentration (59 cps, 130.6 cps, 237 cps respectively) as shown in Table 3. This example indicates that the acid catalyst concentration is important in determining the final molecular weight of the product.

TABLE 3

| Effect of Concentration of HCl on Product Viscosity | | | |
|---|---|---|---|
| g Airnol 103 | 0.72 | 0.72 | 0.72 |
| g Belsperse 161 | 23.75 | 23.75 | 23.75 |
| g 37% HCl | 2.98 | 3.2 | 3.4 |
| % NV | 30.0 | 30.0 | 30.0 |
| Brookfield viscosity of product cps at 25° C. | 59.0 | 130.6 | 237.0 |

EXAMPLE 4

Example 4 illustrates that the degree of cross-linking can be regulated by controlling reaction time. A composition containing 0.72 g Airnol 103, 23.75 g of Belsperse 161, 3.4 g of 37% HCl and 12.13 g deionized water was heated at 99° C. and its viscosity followed as a function of time of reaction. The product advanced from a starting viscosity of 27.5 cps to 54 cp at 8.5 hours and 237 cps at 16 hours.

EXAMPLE 5

This example illustrates the beneficial extension of inhibitor life by cross-linking a phosphino-polyacrylic acid inhibitor with polyvinyl alcohol. The cross-linked product (reacted for 16 hours) in Example 4 was compared with an uncross-linked inhibitor. A berea sandstone core was vacuum evacuated, presaturated with a simulated formation brine at 90° C., and injected with a 2,000 ppm solution of the inhibitor in sea water for 15 pore volumes. The core was then shut in overnight to equilibriate. The core was then back produced with simulated formation brine. The concentration of the inhibitor was followed in the back production phase to monitor the life of the treatment. Inhibitor life can be monitored by existing methods. One method of measuring inhibitor life is disclosed in U.S. Pat. No. 4,514.504 which issued to Rothman. This patent is hereby incorporated by reference herein.

Without cross-linking, the inhibitor was exhausted after back production of 49 pore volumes of formation brine as shown in FIG. 1. In contrast, with the polyvinyl alcohol cross-linked inhibitor, useful concentrations of inhibitor were still produced after 198 pore volumes (FIG. 1). This represents an extension of inhibitor life of at least 4 times.

When utilizing this invention, a cross-linked scale inhibitor as discussed above is injected or "squeezed" down a well into a subterranean formation. The kind of cross-linked inhibitor utilized will of course depend upon conditions encountered in the formation or equipment to be treated. When this cross-linked scale inhibitor is used in solving mineral scaling problems during oil production, the significant extension of life afforded by cross-linking with a polyalcohol improves overall economics of oil production in fields prone to mineral scale. A method for placement of an inhibitor into a formation is discussed in U.S. Pat. No. 3,827,977 issued to Miles et al. This patent is hereby incorporated by reference herein.

Obviously, many other variations and modifications of this invention as previously set forth may be made without departing from the spirit and scope of this invention as those skilled in the art readily understand. One such variation would be to form the polyalcohol-cross-linked inhibitor product in situ in the formation. Such variations and modifications are considered part of this invention and within the purview and scope of the appended claims.

What is claimed is:

1. A method for increasing the retention of a scale inhibitor in a subterranean formation consisting essentially of:
    a) reacting an esterifiable scale inhibitor under esterification conditions in the presence of a strong acid with a polyalcohol thereby cross-linking said inhibitor which results in a substantial increase in the inhibitor's viscosity; and
    b) mixing the cross-linked inhibitor of increased viscosity into water and injecting the resultant mixture into a subterranean formation whereupon said cross-linked inhibitor is retained in the formation for a substantially greater period of time than the inhibitor in its uncross-linked state.

2. The method as recited in claim 1 where the inhibitor in step a) is polyacrylic acid and the polyalcohol is glycerol.

3. The method as recited in claim 1 where the inhibitor in step a) is phosphino-polyacrylic acid and the polyalcohol is polyvinyl alcohol.

4. The method as recited in claim 1 where in step a) reacting said inhibitor, strong acid, and polyalcohol under esterification conditions continues for a time sufficient to obtain a desired degree of cross-linking.

5. The method as recited in claim 1 where in step b) the water comprises salt water or brine.

6. The method as recited in claim 1 where the strong acid is selected from a member of the group consisting of sulfuric acid, hydrochloric acid and trifluoromethane-sulfonic acid.

7. The method as recited in claim 1 where the molecular weight of said inhibitors in step a) is from about 200 to about 20,000.

8. The method as recited in claim 1, where the polyalcohol is a member selected from the group consisting of ethylene glycol, glycerol, and their higher homologs, dihydroxyl-terminated polyethylene oxides or polypropylene oxides, and polyvinyl alcohol of varying degrees of hydrolysis and molecular weight.

9. The method as recited in claim 1 where said polyalcohol has a molecular weight of from about 62 to about several millions.

10. The method as recited in claim 1 where in step a) said inhibitor is a polymer selected from a member of the group consisting of acrylic acid, methacrylic acid, maleic acid, maleic anhydride, itaconic acid, fumaric acid, mesoconic acid, citraconic acid, and monoesters of dicarboxylic acids with alkanols having 1-8 carbon atoms.

11. The method as recited in claim 1 where in step a) said inhibitor is a copolymer selected from a member of the group consisting of vinylacetate, vinyl chloride, vinyl alcohol, acrylate ester, acrylamide, acrylamide derivatives, acrylic acids, methacrylic acid, maleic acid, styrenesulfonic acid, 2-acrylamido-2-methylpropanesulfonic acid, vinylsulfonic acid, and vinylphosphonic acid.

12. The method as recited in claim 1 where in step a) said inhibitor is a member selected from group consisting of alkyl ethoxylated phosphates, ethylenediaminetetramethylene phosphonic acid, aminotrimethylene phosphonic acid, hexamethylenediaminetetramethylene phosphonic acid, diethylenetriaminepentamethylene phosphonic acid, hydroxyethylidene diphosphonic acid and polyvinyl phosphonic acid.

13. The method as recited in claim 1 where the step (a) the strong acid is used during esterification and a reaction is conducted at from about 50° C. to about 150° C. for about 6 to about 60 hours.

14. The method as recited in claim 1 where said polyalcohol has a molecular weight of from about 500 to about 130,000.

15. The method as recited in claim 1 where in step a) upon obtaining a desired viscosity the inhibitor is partially neutralized with a base to quench esterification.

16. A composition that increases the retention of a scale inhibitor in a subterranean formation consisting essentially of:
an esterifiable scale inhibitor which is reacted under esterification conditions in the presence of a strong acid with a polyalcohol thereby cross-linking said inhibitor which results in a substantial increase in the inhibitor's viscosity that causes the cross-linked inhibitor, when mixed with water and injected into a subterranean formation, to be retained therein for a substantially greater period of time than is possible with said inhibitor in its uncross-linked state.

17. The composition as recited in claim 16 where the inhibitor is polyacrylic acid and the polyalcohol is glycerol.

18. The composition as recited in claim 16 where the inhibitor is phosphino-polyacrylic acid and the polyalcohol is polyvinyl alcohol.

19. The composition as recited in claim 16 where in step a) reacting said inhibitor, strong acid, and polyalcohol under esterification conditions continues for a time sufficient to obtain a desired degree of cross-linking.

20. The composition as recited in claim 16 where the water comprises salt water or brine.

21. The composition as recited in claim 16 where the strong acid is selected from a member of the group consisting of sulfuric acid, hydrochloric acid, and trifluoromethane-sulfonic acid.

22. The composition as recited in claim 16 where the molecular weight of said inhibitor is from about 200 to about 20,000.

23. The composition as recited in claim 16 where upon obtaining a desired viscosity the inhibitor is partially neutralized with a base to quench esterification.

24. The composition as recited in claim 16 where said inhibitor comprises alkyl ethoxylated phosphates, ethylenediaminetetramethylene phosphonic acid, aminotrimethylene phosphonic acid, hexamethylenediamine-tetramethylene phosphonic acid, diethylenetriaminepentamethylene phosphonic acid, hydroxyethylidene diphosphonic acid and polyvinyl phosphonic acid.

25. The composition as recited in claim 16 where the polyalcohol is a member selected from the group consisting of ethylene glycol, glycerol, and their higher homologs, dihydroxy-terminated polyethylene oxides or polypropylene oxides, and polyvinyl alcohol of varying degrees of hydrolysis and molecular weight.

26. The composition as recited in claim 16 where said polyalcohol has a molecular weight of from about 62 to about several millions.

27. The composition as recited in claim 16 where said inhibitor is a polymer selected from a member of the group consisting of acrylic acid, methacrylic acid, maleic acid, maleic anhydride, itaconic acid, fumaric acid, mesoconic acid, citraconic acid, and monoesters of dicarboxylic acids with alkanols having 1-8 carbon atoms.

28. The composition as recited in claim 16 where said inhibitor is a copolymer selected from a member of the group consisting of vinylacetate, vinyl chloride, vinyl alcohol, acrylate ester, acrylamide, acrylamide derivatives, acrylic acid, methacrylic acid, maleic acid, styrenesulfonic acid, 2-acrylamido-2-methylpropanesulfonic acid, vinylsulfonic acid, and vinylphosphonic acid.

29. The composition as recited in claim 16 where said polyalcohol has a molecular weight of from about 500 to about 130,000.

* * * * *